(12) United States Patent
Schaefer

(10) Patent No.: US 8,723,790 B1
(45) Date of Patent: *May 13, 2014

(54) SYSTEM AND METHOD FOR DETECTING FACIAL GESTURES FOR CONTROL OF AN ELECTRONIC DEVICE

(76) Inventor: Philip Raymond Schaefer, Weaverville, NC (US)

( * ) Notice: Subject to any disclaimer, the term of this patent is extended or adjusted under 35 U.S.C. 154(b) by 24 days.

This patent is subject to a terminal disclaimer.

(21) Appl. No.: 13/385,944

(22) Filed: Mar. 15, 2012

Related U.S. Application Data

(63) Continuation of application No. 12/287,087, filed on Sep. 26, 2008, now Pat. No. 8,160,311.

(51) Int. Cl.
*G09G 5/00* (2006.01)
(52) U.S. Cl.
USPC .......................................................... 345/156
(58) Field of Classification Search
None
See application file for complete search history.

(56) References Cited

U.S. PATENT DOCUMENTS

| | | | |
|---|---|---|---|
| 4,145,122 A | 3/1979 | Rinard | |
| 4,659,197 A | 4/1987 | Weinblatt | |
| 4,720,189 A | 1/1988 | Heynen | |
| 4,836,670 A | 6/1989 | Hutchinson | |
| 5,180,907 A | 1/1993 | Udden | |
| 5,231,674 A | 7/1993 | Cleveland | |
| 5,270,748 A | 12/1993 | Katz | |
| 5,345,281 A | 9/1994 | Taboada | |
| 5,844,544 A | 12/1998 | Kahn | |
| 6,121,953 A * | 9/2000 | Walker | 345/156 |
| 7,221,437 B1 | 5/2007 | Schaefer | |
| 7,369,951 B2 | 5/2008 | Blosser | |

OTHER PUBLICATIONS

Words+, Inc., Infrared/Sound/Touch (IST) Switch Product Specifications Sheet, Revised Feb. 20, 2004, web page, www.words-plus.com/website/pdf_files/istswtch.pdf, Lancaster, CA, USA.

* cited by examiner

*Primary Examiner* — Adam R Giesy

(57) ABSTRACT

A control system enables a user to control an electronic device by moving parts of the face, including the eyes. Optical emitters and optical detectors are used to reflect light from the relevant parts of the user's face. Pattern matching or approximation of a pointing location are used to define the control input to the electronic device based on the user's motions. Visual feedback is optionally provided to the user during the controller's actions. Additional sensor elements are optionally provided to improve performance of the system. Hardware and software elements are combined to provide for the specified control actions.

18 Claims, 10 Drawing Sheets

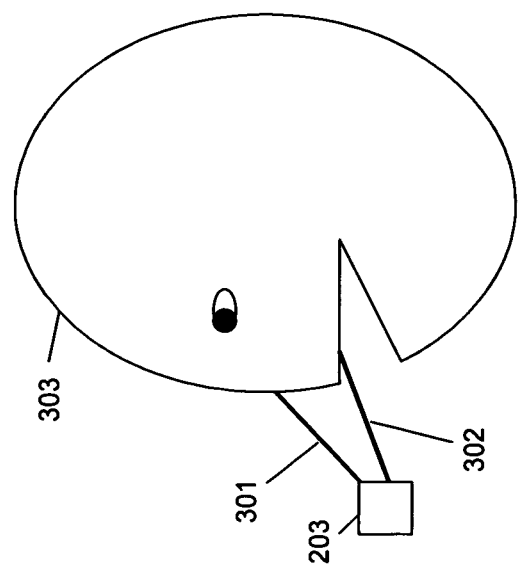
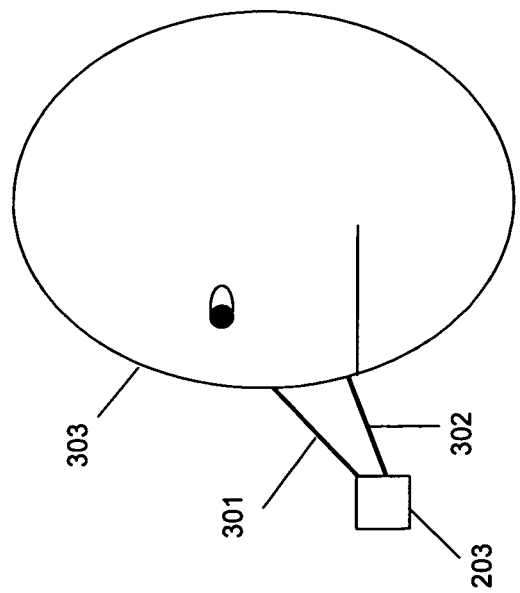

SYSTEM AND METHOD FOR DETECTING FACIAL GESTURES FOR CONTROL OF AN ELECTRONIC DEVICE

CROSS-REFERENCE TO RELATED APPLICATIONS

This is a continuation of application Ser. No. 12/287,087, filed Sep. 26, 2008, now U.S. Pat. No. 8,160,311, granted Apr. 17, 2012.

GOVERNMENT LICENSE RIGHTS

This invention was made with United States government support under one or more SBIR grants from the National Institutes of Health. The United States government has certain rights in this invention.

FIELD OF INVENTION

This invention relates generally to sensing position and movements of facial features and, more particularly, to a device that uses light to sense the position and motion of a user's face or parts of the face, including mouth or eyes, to provide an interface to an electronic device.

BACKGROUND OF THE INVENTION

The Microsoft® Windows and Macintosh® operating systems have revolutionized computer usability for many people by providing a visually-oriented computer screen that can be accessed by pointing and clicking at the objects on the screen. This graphical, window-based interface provides an intuitive replacement for the complex internal representation of the underlying computer data. The vast majority of people find the visually-based organization much easier to use, and many years of development effort have been devoted to creating an easy-to-use environment. By far, most people use a mouse device to control the computer to point and click. However, many people have a requirement for a different approach than a mouse for pointing or clicking. For example, individuals with high-level Spinal Cord Injury (SCI), ALS, or other conditions may not be able to effectively operate a device such as a mouse with their hands.

Various approaches have been presented for tracking other body features with light, such as motions of the face. For example, the IST switch from WordsPlus (see www.wordsplus.com/website/pdf_files/istswtch.pdf) uses a simple infrared reflective device that can clip on to objects such as eyeglasses and detect simple gestures such as an eye blink. A slightly more complex approach, disclosed in U.S. Pat. No. 7,369,951 to Blosser and Eulenberg, similarly uses an infrared reflection, and allows for setting thresholds. With proper thresholds, this type of device can detect an eye blink or other facial movements, such as a raising a cheek or sticking out the tongue. These switches are relatively simple on/off devices. The drawback of these devices is that they tend to be too simple for some uses, and because they are general purpose (i.e., usable for many different types of motions), they are not fine-tuned to a particular type of facial gesture and thus require precise set up and calibration each time they are used. They provide only a simple on/off switch output. Since it is only an on/off approach, these devices are not very suitable for pointing input for a device such as a computer, but may be suitable for providing the click input, therefore do not replace all mouse functions. Additionally, these simple approaches are not well-suited to monitoring gestures from the mouth because they have no way of separating an intentional mouth gesture from a mouth movement naturally made during speech.

For higher precision, various approaches have been presented to help with pointing needs. For example, head trackers, such as the infrared device disclosed in U.S. Pat. No. 7,221,437 to Schaefer, have been invented to follow the motion of the head and move the computer pointer accordingly. However, for some users, moving the head is difficult or leads to discomfort. For many such users, making facial gestures or moving the eyes is an easier way to achieve the control they need.

Eye tracking devices have been invented to allow control with movements limited to the face. However, their drawbacks are in some ways the opposite of the simple optical switches described above—they tend to be complex, expensive, and difficult to use. For example, U.S. Pat. No. 4,145,122 to Rinard discloses eyeglasses containing an infrared mirror and a video camera to watch the eye. U.S. Pat. No. 4,659,197 to Weinblatt shows a device with many mechanical parts, semi-silvered mirrors, etc. U.S. Pat. No. 5,844,544 to Kahn, et. al. has lenses and a semi-silvered mirror to measure the orientation of the eye. U.S. Pat. No. 5,345,281 to Taboada discloses a device with beamsplitters and motors to track the position of the pupil. U.S. Pat. No. 5,270,748 to Katz depicts a curved surface with an array of detectors to locate a reflection from a light source and infer the eye's position from that. U.S. Pat. No. 4,720,189 to Heynen discloses the use of a spatial filter to create a rectangular pattern from the reflection from the eye. U.S. Pat. No. 5,231,674 to Cleveland, et al. and U.S. Pat. No. 4,836,670 to Hutchinson disclose image-based approaches, requiring video imagery of the eye.

A somewhat simpler approach than the above is described by Udden in U.S. Pat. No. 5,180,907, in which an internal light source is added to the light originating with another LED and reflected from the eye, so as to keep the total light level constant. This mechanism is provided to reduce the problem of calibrating the non-linear response from a simple LED/detector pair. However, it is doubtful that this somewhat simpler approach provides sufficient accuracy for use in pointing, as there are many types of nonlinearity in the disclosed system than are caused by the light response of the detectors.

The main technical difficulty that must be overcome for success with eye tracking devices in the art is that great precision is required to be able to move a pointer to the exact place the eye is looking. If there is any error, the pointer will not be exactly where the user is looking, so it will be very difficult for the user to see the pointer, resulting in the user chasing the pointer around in an attempt to look at it. With a head tracker, this is not such an issue, because if there is some error, the user simply can aim the eyes at the pointer, even if the head as a whole is not exactly aligned with the eyes. Thus, the reason the eye trackers in the prior art tend to be complex and expensive is because they are required to have very high precision to be useful. However, once working, these devices are appropriate for providing the pointing input to a device such as a computer.

To summarize, several optical technologies are available for sensing the position of parts of the face, such as the eyes. On one extreme are eye trackers, which require extreme precision and complexity to provide accurate pointing. On the other extreme are simple switch-type devices that provide only simple on/off switching input.

OBJECTS AND ADVANTAGES OF THE PRESENT INVENTION

Therefore, several objects and advantages of the present advantage are:

(a) to provide an optical control technology that is relatively simple, but can also provide point and click functionality from subtle movements of parts of the face, (b) to provide point and click functionality to users who have disabilities preventing them from using a standard mouse, (c) to make use of existing objects the user may be wearing on the head, such as eyeglasses or headsets, (d) to allow the user to control things with mouth movements without inadvertent activation while speaking, (d) to provide more than simple on/off functionality to the user of the technology, and (e) to avoid the need for manual setting of thresholds to obtain useful outputs from the system.

Still further objects and advantages of the present invention will become apparent from a consideration of the ensuing description and drawings.

SUMMARY OF THE INVENTION

The subject invention is a system that uses a small number of infrared light-emitting devices and/or light-detection devices to create a pattern of light on all or a part of the face of a user. The device interprets the changes in the pattern of the light as a control output representing a command of a selection from the user. Alternately, the device can interpret the pattern of the light as an approximate position indication.

In one embodiment of the invention, the infrared devices are mounted on a microphone boom and categorize the movements of the user's mouth and lips. In another embodiment of the invention, input from a microphone is additionally combined with the optical data to differentiate between intentional mouth gestures and mouth motions that are associated with speech.

In another embodiment of the invention, infrared devices are mounted on an eyeglass frame and categorize the movements of the user's eyes. A major advantage of the present invention in this context is that intelligence in the system allows it to measure only approximate eye motion, rather than requiring the high precision of the existing art. In another embodiment of the invention, optical context analysis provides an additional input to differentiate between intentional eye gestures and eye gestures associated with the user scanning new visual information.

In another embodiment of the invention, the categorization of movements is converted into point and click operations on a computer screen by reducing the number of point and click operations to a small set from which the user can choose. In another embodiment of the invention, the categorization of movements is converted into a selection of items from a menu or list.

In yet another embodiment of the invention, the categorization of movements is converted into a stream of symbols for interpretation by the electronic device.

BRIEF DESCRIPTION OF THE DRAWINGS

FIGS. 3a and 3b provide an illustration of how the mouth gestures of a user are detected by the mouth gesture control system.

DESCRIPTION OF THE PREFERRED EMBODIMENTS

The availability of low-cost Light-Emitting Diodes (LEDs) and photodetectors (PDs), such as photodiodes and phototransistors, has provided a powerful capability for achieving many kinds of sensing. In the present invention, these components are used in new ways to measure and interpret motions of parts of the user's face, including the eyes. In the description that follows, it will be assumed that LEDs and PDs are used. However, these may be replaced, if desired, with similar results by other light emitting sources and light detecting devices, infrared or otherwise, such as lamps, photosensitive materials, etc.

As discussed above, many people need to be able to control electronic devices such as computers without the use of their hands, or perhaps in conjunction with the use of their hands. One use for the present invention is for pointing and clicking on objects displayed by a computer. However, there are many other applications of the present invention, such as controlling personal digital assistants (PDAs), video games, telephones, medical equipment, etc.

Figure 1:
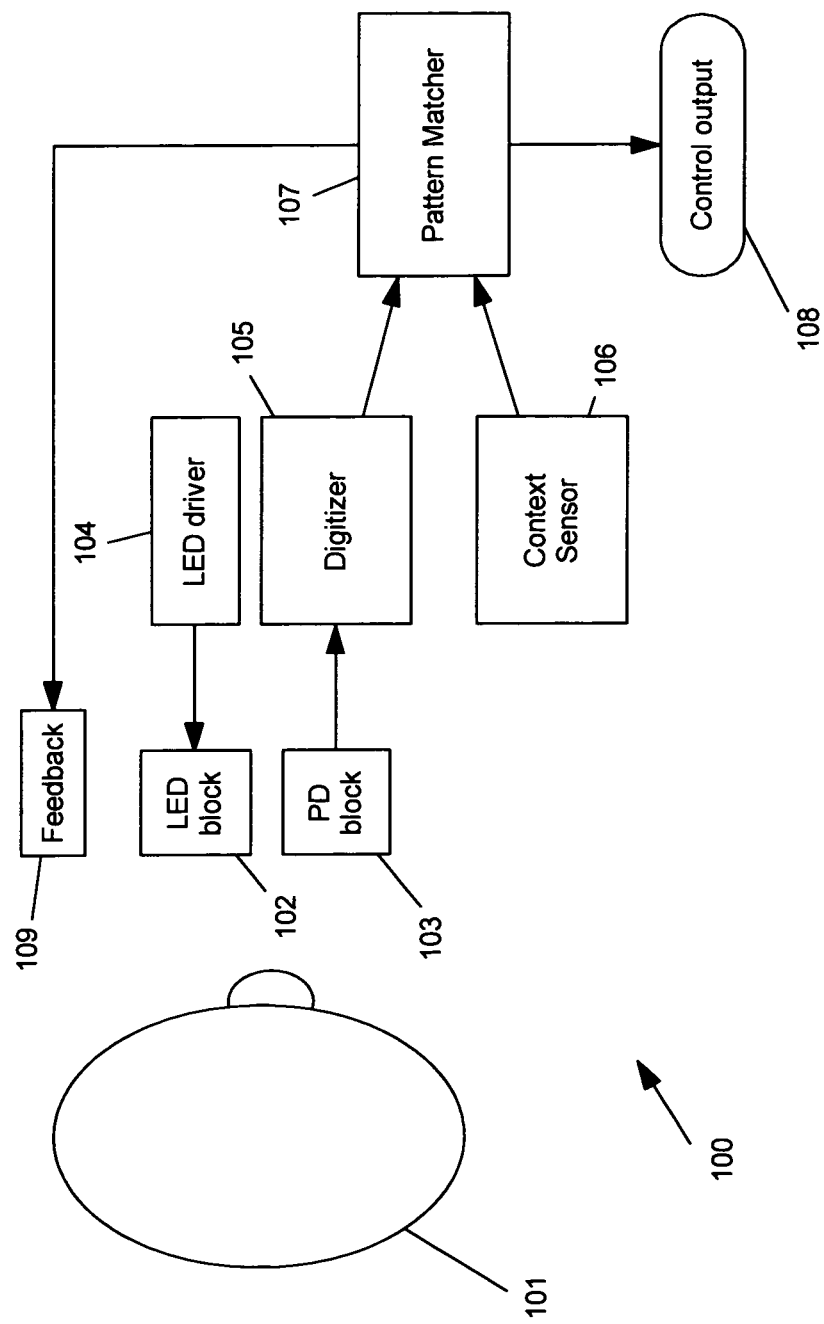
FIG. 1 is a block diagram of a preferred embodiment of a face-based control system of the present invention.

FIG. 1 is a block diagram of a preferred embodiment of a face-based control system 100 of the present invention. LED driver 104 generates an electrical signal that causes LED block 102 to shine light on the face or part of the face of user 101. LED block 102 is a set of one or more LEDs. Preferably the light from LED block 102 is modulated, for example at 1000 Hz, to distinguish its light from ambient light. PD block 103 receives light reflected from the face of user 101. PD block 103 is a set of one or more PDs. This light is digitized in digitizer 105. Preferably, LED block 102 contains at least three LEDs and PD block 103 contains at least one PD, but any number may be used in the present invention. The reason for having multiple PDs and LEDs is so that the light reflected from different areas of the user's face can be detected, thus producing a spatial pattern of lighting and thus to distinguish various facial motions from each other by the relative and/or absolute changes in the spatial pattern of lighting.

Pattern matcher 107 receives the set of light intensities from digitizer 105 representing the light reflected from the pattern of multiple lighted areas of the face. Digitizer 105 may either serially convert the outputs of all devices in PD block 103 into digitized values, or alternately, provide separate outputs for the devices in PD block 103 in parallel, or a combination of both. Pattern matcher 107 is a conversion module that converts the light intensities from digitizer 105 into a conversion output specifying categories. Based on the spatial pattern of light intensities, pattern matcher 107 categorizes the light intensities as a control output category and provides this output as control output 108. In the preferred embodiment, this control output indicates one of a finite set of control outputs, for example, one of a set of eight facial categories that correspond to commands. Preferably, pattern matcher 107 also uses the temporal pattern of the light intensities from digitizer 105 as part of its decision making. For example, the pattern of light intensities may need to have a characteristic relative amplitude ratio for a specified amount of time, for example two seconds. This can help to distinguish intentional facial motions from transient, unintentional motions.

There are several ways that pattern matcher 107 may perform its function. In the preferred embodiment, the user is asked to provide at least one example or "template" of each of the facial motion categories that is to be detected. The spatial and/or temporal patterns of the light intensities are recorded by pattern matcher 107. Then, in operation, pattern matcher 107 compares the incoming patterns from digitizer 105 to each of the stored template patterns. This comparison can be done with techniques such as vector distance calculations, or other techniques known in the art. Another embodiment of pattern matcher 107 is a Neural Network, in which the templates and incoming data are used to train and run the Neural Network, respectively, using Neural Network techniques known in the art.

The output of pattern matcher 107 is a control output 108 indicating which category has been detected, preferably including a possible output indicating that no predefined category has been detected. The latter output could be provided, for example, if the incoming pattern from digitizer 105 is not similar enough to any of the stored template patterns. Preferably, control output 108 is a number, for example, an integer between 0 and 255. Alternately, control output 108 can be any output indicative of the category determined by pattern matcher 107 that is useful for a function of the electronic device with which user 101 is interfacing with or controlling. It could alternately be a voltage whose value indicates which category is being output.

Optionally, face-based control system 100 additionally has a context sensor 106. Context sensor 106 provides information about the user activity, for example, what user 101 is doing or experiencing that may affect the decisions made by pattern matcher 107. For example, if digitizer 105 is providing information about the user's mouth, context sensor input 106 would preferably provide information as to whether the user is speaking. This would enable pattern matcher 107 to conclude, for example, that mouth-motion commands are not being issued by the user if the user is currently speaking.

Optionally, face-based control system 109 additional has a feedback output 109. feedback 109 is hardware or software that provides an indication to the user of what face-based control system 100 is doing. For example, feedback output 109 could light a visible LED to indicate which category is being output by pattern matcher 107. Alternately, feedback 109 could provide an audio or visual indication on the display of the electronic device, for example, a color or change in brightness of an area on a computer window or provide a beep feedback signal.

Figure 2:
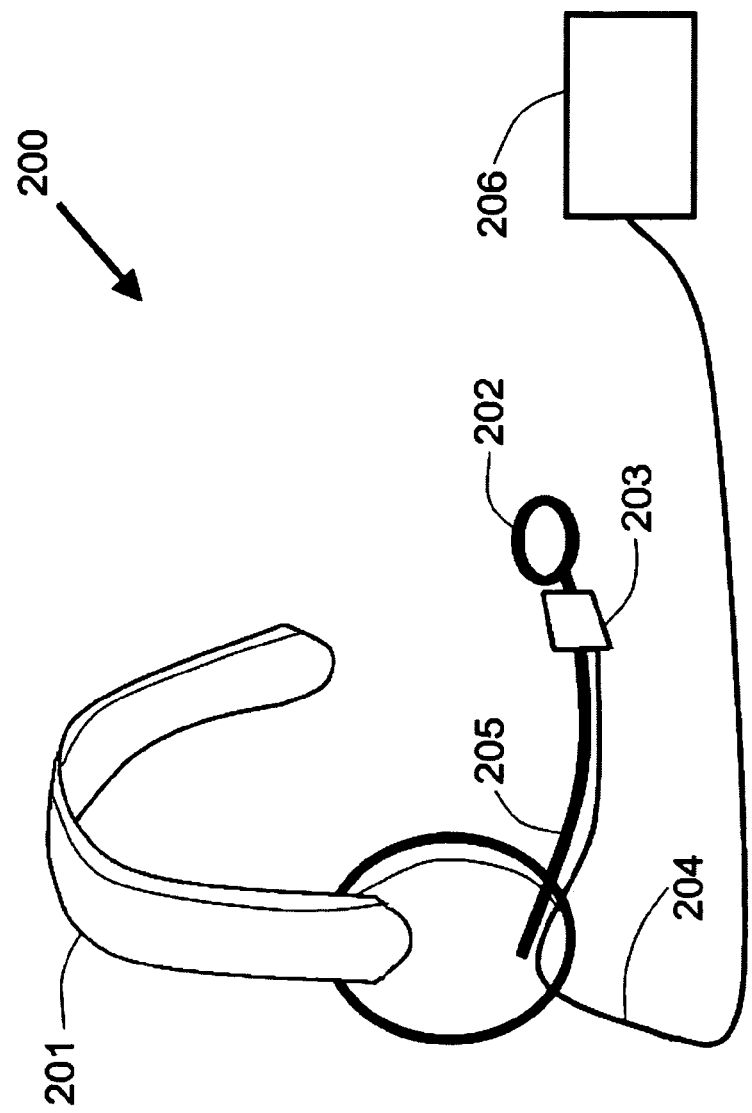
FIG. 2 depicts a preferred embodiment of a mouth gesture control system of the present invention.

FIG. 2 depicts a preferred embodiment of a mouth gesture control system 200 of the present invention. Mouth gesture control system 200 is one way to implement face-based control system 100. The platform on which the mouth gesture control system 200 is built is headset 201 with microphone boom 205 and microphone 202, although it could be built on any other structure that could hold the invention near the user's mouth. Such headsets are commonly used by telephone workers, such as receptionists, call-center employees, etc. Thus, mouth gesture control system 200 would be an ideal tool for a user that already uses a headset 201, for example, at work. Circuit board 203 contains the optical components of LED block 102 and PD block 103. Preferably, this circuit board will also contain some or all of the circuitry involved with digitizer 105 and pattern matcher 107, although some or all of digitizer 105, (optionally) context sensor 106, and pattern matcher 107 may be contained in optional external electronics module 206. Circuit board 203 is mounted so that the optical devices measure data from the vicinity of the area of the user's mouth, chin, and/or cheeks. Preferably, microphone 202 is an input to context sensor 106, which measures the intensity of sound. If microphone 202 is an input to context sensor 106, a connection could be made from microphone 202 to either circuit board 203 or to external electronics module 206. When an intensity of sound from microphone 202 is above a threshold level, context sensor 106 will provide an indication to pattern matcher 107 that the user is speaking. Optionally, a second microphone could be used to monitor the background noise, so that only those sounds more predominant on microphone 202 than on the external microphone would be treated as sounds originating from the user. Alternately, another microphone could be included with circuit board 203 to avoid connecting to the existing headset microphone 202. Preferably, pattern matcher 107 will indicate that no command is currently being issued by the user when the user is speaking. Context sensor 106 may use the microphone 202 input by amplifying it and creating an envelope waveform indicating the audio intensity, using techniques known in the art. Cable 204 transmits the results of whichever stages of processing are contained on circuit board 203 to the external world. At the other end of cable 204 on external electronics module 206 may be further electronics that contain the components of control system 100 that are not contained on circuit board 203. Optionally, cable 204 may be replaced by a wireless link, such as Bluetooth, using techniques known in the art. If desired, external electronics module 206 could be eliminated if all the circuitry described above is contained on circuit board 203, or if the functionality not contained on circuit board 203 is included in the electronic device. If extremely miniaturized circuitry is used, even circuit board 203 could be eliminated. Alternately, circuit board 203 could be located elsewhere than on the microphone boom 205 to reduce the amount of circuitry on the microphone boom 205, for example, by providing a mirror, optical fibers, or other mechanism to reflect the light from the correct places on the user.

FIGS. 3a and 3b provide an illustration of how the mouth gestures of a user are detected by mouth gesture control system 200. In FIG. 3a, user 303 has a closed mouth. Infrared (IR) beams 301 and 302 are reflected from different areas near the mouth of user 303, and detected by the electronics on circuit board 203. In FIG. 3b, user 303 now has an open mouth. IR beam 301 is approximately the same intensity as was earlier detected in FIG. 3a. However, in FIG. 3b, IR beam 302 is now of a lower intensity than it was in FIG. 3a, due to the mouth being open. For detection of this mouth gesture, the important characteristic is not the absolute intensity of the IR beams 301 and 302, but the occurrence that IR beam 302 decreases with respect to IR beam 301. This provides one of the advantages of the present invention, that relative patterns can be used to detect gestures or motions of the face, rather than absolute values that require careful thresholds to be defined.

In similar fashion, with several LEDs and PDs, a variety of other mouth, check, tongue, and chin gestures can be recognized by pattern matcher 107, based on the relative or absolute values of the received light intensities from the light patterns. Techniques for implementation of the electronic circuitry to perform the functions described above are known in the art.

Figure 4:
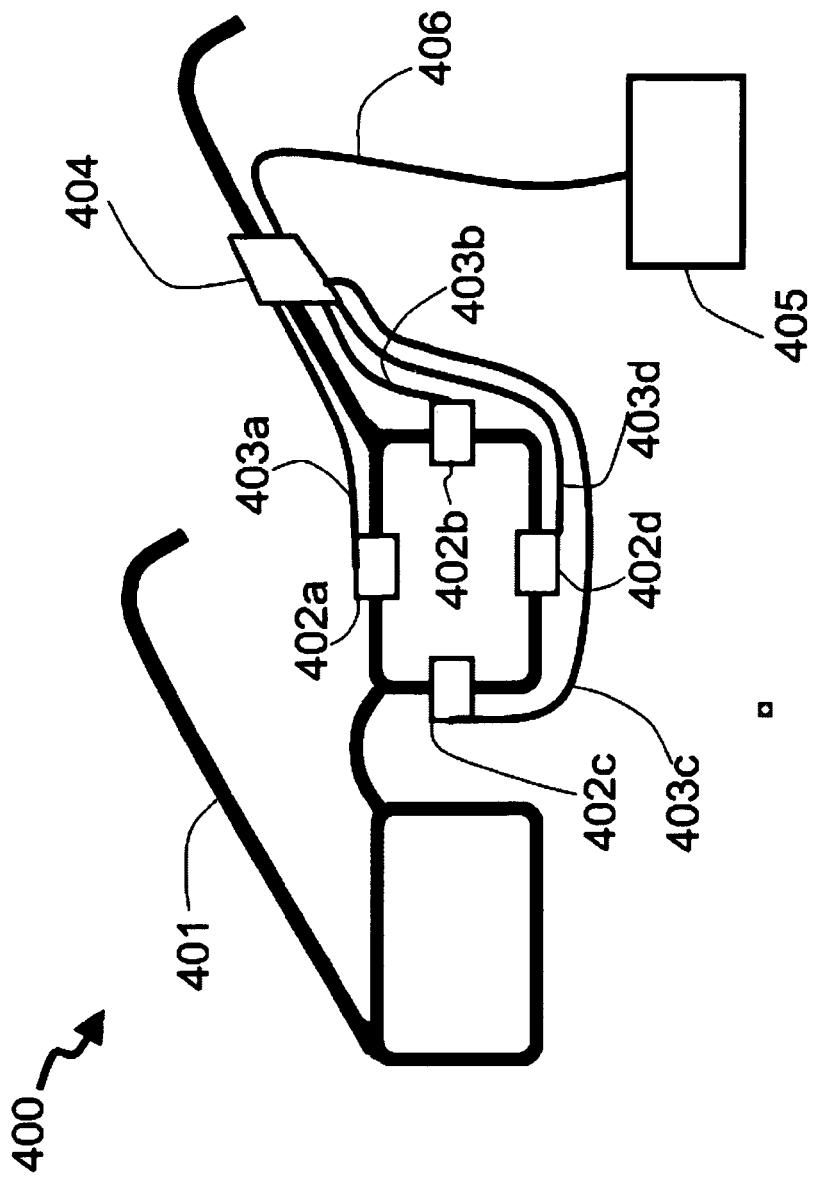
FIG. 4 depicts a preferred embodiment of an eye movement control system of the present invention.

FIG. 4 depicts a preferred embodiment of an eye movement control system 400 of the present invention. Eye movement control system 400 is one way to implement face-based control system 100. Eye movement control system 400 is built on the platform of eyeglass frame 401, although it could be built on any other structure that could hold the invention near the user's eye. Circuit boards 402a, 402b, 402c, and 402d contain the optical components of LED block 102 and PD block 103. Optionally, these circuit boards may also contain visible LEDs of feedback 109. Alternately, circuit boards 402a, 402b, 402c, 402d could be replaced by just the optical components, eliminating the circuit boards, for example, by molding the optical components of LED block 102 and PD block 103 into the plastic of the eyeglass frame 401. FIG. 4 depicts four circuit boards; however a smaller or larger number of such boards could be used with the present invention. In the preferred embodiment, circuit boards 402a, 402b, 402c, and 402d each contain one LED and one PD, although this could also be different. Cables 403a, 403b, 403c, and 403d connect the circuit boards 402a, 402b, 402c, and 402d to optional main circuit board 404, which contains other electronic components needed to implement eye movement control system 400. Preferably, this circuit board or circuit boards 402a, 402b, 402c, and 402d will also contain some or all of the circuitry involved with digitizer 105 and pattern matcher 107, although some or all of digitizer 105, (optionally) context sensor 106, and pattern matcher 107 may be contained in optional external electronics module 405. Optionally, a cable 406 may extend from main circuit board 404 to external electronics module 405, if it is desired to minimize the size or weight of circuitry on the eyeglass frame 401. Preferably, a wireless link connects main circuit board 404 to external electronics module 405, or optionally, instead to the electronic device being controlled, for example, a computer, for example by a Bluetooth link.

If boards 402a, 402b, 402c, and 402d contain visible feedback LEDs of feedback 109, there are several ways in which they can be used. Preferably, these visible LEDs are all lit when eye motion control system 400 is waiting for user input. Thus, they serve as targets toward which the user may move the eye. These LEDs may also be blinked when a motion corresponding to the direction of the board has been detected by pattern matcher 107. Techniques for implementation of the electronic circuitry to perform the techniques described above are known in the art.

Alternately, circuit boards 402a, 402b, 402c, and 402d could be located elsewhere than on eyeglass frame 401 to reduce the amount of circuitry on eyeglass frame 401, for example, by providing a mirror, optical fibers, or other mechanism to reflect the light from the correct places on the user's eye. Similarly, circuit board 404 could be located elsewhere than on eyeglass frame 401.

Figure 5B:
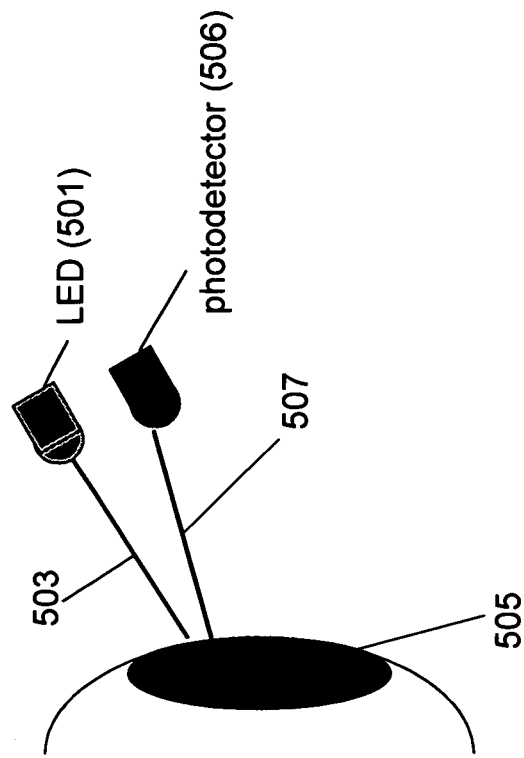
FIG. 5b illustrates an alternate embodiment of the invention, in which a photodetector is located on the same side of the eye as an LED.
Figure 5A:
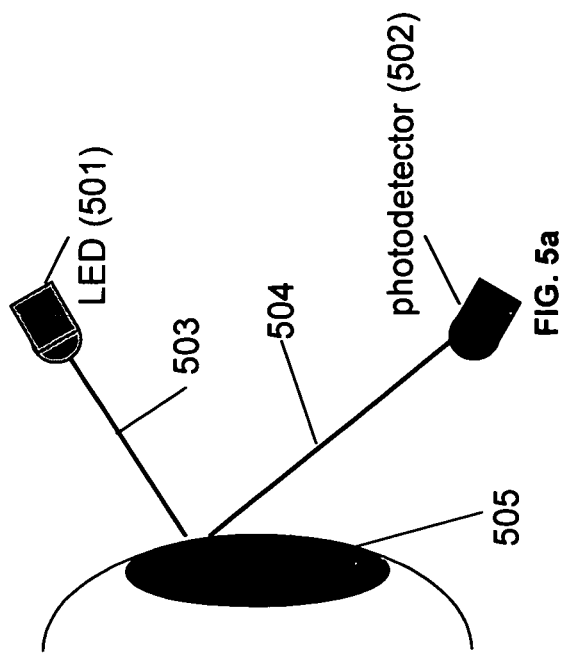
FIG. 5a illustrates how the eye movements of a user may be detected.

FIG. 5a illustrates how the eye movements of a user may be detected by circuit boards 402a, 402b, 402c, and 402d. LED 501, which is one of the LEDs on circuit boards 402a, 402b, 402c, or 402d emits beam 503, which is reflected as beam 504 to PD 502, which is one of the PDs on circuit boards 402a, 402b, 402c, or 402d. If the user's pupil 505 is largely aimed at where beams 503 and 504 meet, the detected light intensity at PD 502 will be relatively low. However, if the pupil 505 is pointed in another direction, some of the light from beam 503 may be reflected from the sclera, or white portion of the eye around pupil 505, resulting in a higher received intensity at PD 502.

For systems in which it is desirable to separate eye motions of looking around from eye motions that are to be interpreted as commands, pattern matcher 107 can be used to advantage. For example, preferably eye motions must be of a large amplitude and also be retained for a relatively long time (e.g., two seconds) to be considered a command.

FIG. 5b illustrates an alternate embodiment of the invention, in which a PD 506 is located on the same side of the eye as LED 501. In this embodiment, light beam 507 is reflected back from LED 501 to PD 506. The operation of this embodiment is similar to that described in FIG. 5a.

Figure 6:
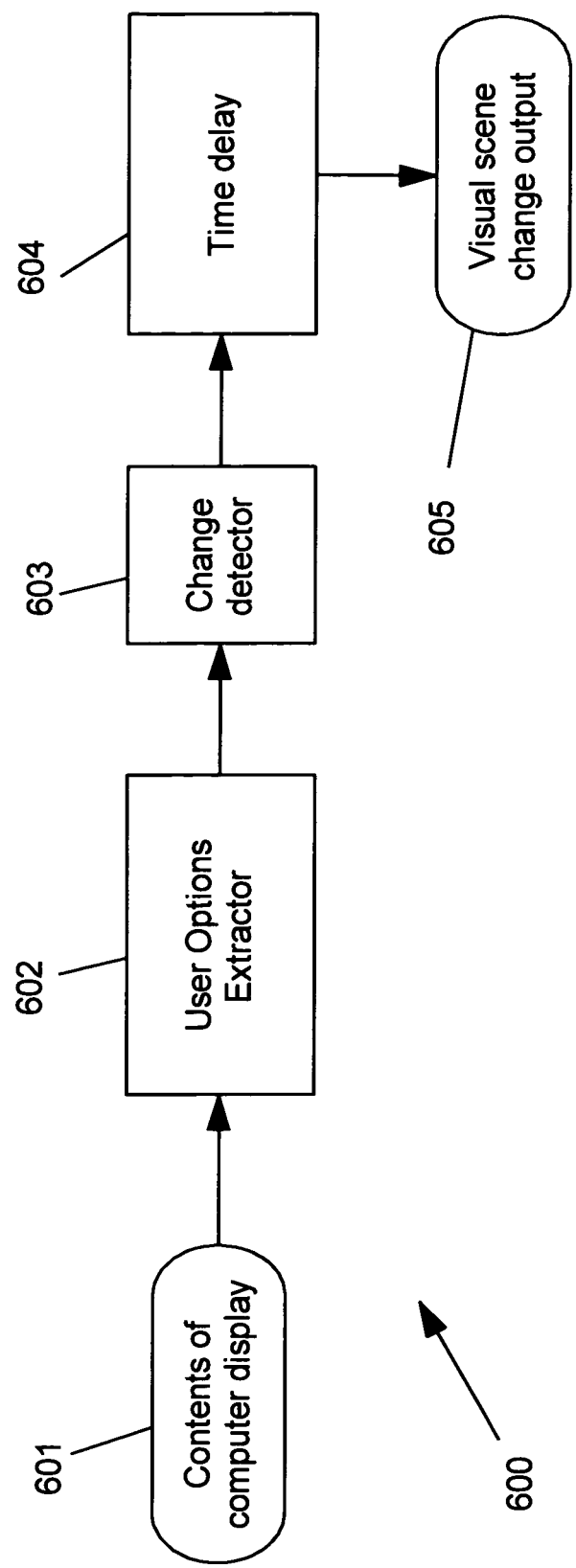
FIG. 6 is a block diagram of a preferred embodiment of a visual context sensor.

FIG. 6 is a block diagram of a preferred embodiment of a visual context sensor 600. Visual context sensor module 600 is one way to implement context sensor 106 and can be optionally used as an additional input to pattern matcher 107, for example, as part of eye movement control system 400. In the preferred embodiment of visual context input module 600, user options extractor 602 is in communication with the electronic device, and obtains the set of objects on the user interface with which the user has an option to interact. Herein, these objects will be referred to as "user options." The user options include things such as buttons, links, text input fields, etc., that a user of the electronic device may wish to use. Change detector 603 monitors the set of user options for changes. When a change in the user options has occurred, this indicates the display has changed, and that the user will most likely be scanning the display to see the changes. Preferably, this condition is interpreted as indicative that the user is less likely to be immediately providing input commands to the system, and that detected eye motions are more likely to be simply scanning. Visual scene change output 605 is provided as an output. Time delay 604 may optionally be used to control the length of time the system expects the user to be visually scanning. Time delay 604 may be a fixed time, for example, five seconds, or a time delay computed from the amount of change that has occurred. Preferably, visual scene change output 605 is a true/false output indicating whether the visual scene has recently changed. Alternately, visual scene change output 605 may be an indication of the locations of the visual scene change, for example, a data structure indicating where in the coordinate system of the display of the electronic device that changes have occurred, or alternately, a number indicating the magnitude of the visual scene change, for example, a number between 0.0 and 1.0. This can be fed into pattern matcher 107, which can process the information by increasing the thresholds of motion required for the output of a command, such as by using the visual scene change output 605 in Bayesian probability calculations or other techniques known in the art, or alternately, by simply preventing the output of commands during the indication of visual scene change output 605. This type of processing may help, for example, to reduce the error rate of eye motion control system 400.

There are at least three software techniques known in the art to extract the user options by user options extractor 602. One approach is to use "hooks", such as those supplied in the Microsoft® Windows® operating system. These hooks can be used to watch for window and display item creation events, and use the information from relevant display items, as they are created, to extract the needed data, if these hooks are available on the electronic device. Another approach is to use "Object Models" provided for various software applications. Another approach in the Microsoft® Windows® operating system is the "Active Accessibility Toolkit". The Active Accessibility Toolkit can extract much of the information needed on IBM-compatible PCs. Alternately, the electronic device may be configured to actively provide the data, for example, with computers or other devices that do not provide the above capabilities. Alternately, a set of predefined "templates" of the available display items for the various possible displays in each mode in which the electronic device operates can be used. In this case, the extraction module 602 looks up the user options each time the electronic device enters a new mode, for example, when a telephone goes into a mode of listing message, and outputs the looked-up display items.

An alternate embodiment of a visual context sensor could be a simple photodetector or set of photodetectors, for example, detecting different visible colors, aimed at the visual display of the electronic device. Rather than looking for specific changes in specific parts of the display, this approach would detect overall changes in light intensity, also typically indicative of a display change. Alternately, a photodetector or a set of photodetectors could be aimed at the user, but not affixed to eyeglass frame 401, or affixed to eyeglass frame 401 and aimed away from the user. In either case, if the user changes position or if the light coming toward the user changes, it could be indicative that the visual scene in front of the user has changed, also indicating the user is likely scanning the new information and not making a command at that time.

Yet another embodiment of a visual context sensor would be a motion sensor to detect head motion of the user. For example, a head tracker could be used, or sensors such as an accelerometer could be attached to eyeglass frame 401 to measure motion of the user's head. When such motions occur, the user's eyes are likely to move in a compensatory direction. For example, if the head moves downward, the eyes will move upward to continue looking at the same point in space. This information could be used either to prevent outputs from pattern matcher 107, or to correct for the changes indicated by the output of digitizer 105. Other embodiments of a visual context sensor, such as analysis of video images, are also within the scope of this invention and can be implemented with techniques known in the art.

Using the Outputs for Control of the Electronic Device

There are several ways the outputs of the present invention can be used. For example, the present invention can provide a discrete digital control output indicating which one of a set of motions has been detected from the user's facial or eye motions. For example, control output 108 could be used to select items from a menu or list, to represent members from a set of symbols, or to perform click operations, based on which motion has been detected. In a preferred embodiment, there could be four possible facial motions corresponding to left-click, double-click, right-click, and drag/drop—all are common operations performed by mouse buttons on IBM-compatible PCs. Control output 108 of FIG. 1 could be interpreted as one of these commands, and a controller could generate the appropriate actions within the electronic device using techniques known in the art. For example, if the electronic device is a computer with the Windows operating system, a function called mouse_event could be used for this purpose.

One of the drawbacks of the prior art in eye trackers described above is that very high resolution is required to allow them to be used for pointing. However, pointing is a very useful capability. Even if an embodiment of the present invention does not provide extremely high resolution, the present invention may be used for most of the common pointing tasks required on an electronic device.

Figure 7:
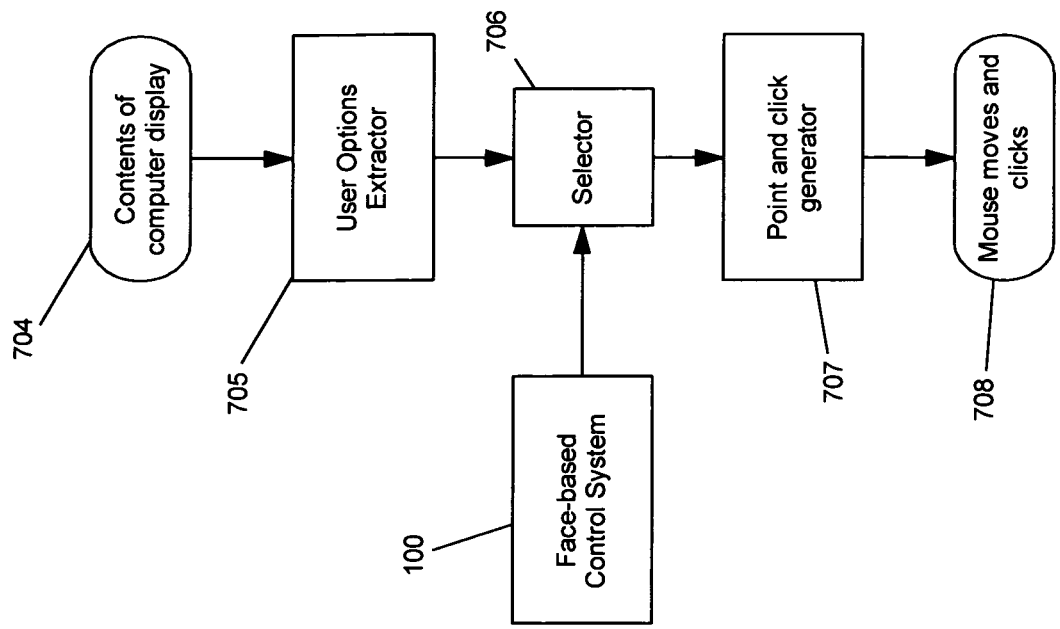
FIG. 7 is a block diagram of a preferred embodiment of a pointing control system of the present invention.

FIG. 7 is a block diagram of a preferred embodiment of a pointing control system 700 of the present invention. Instead of requiring the user to precisely position the pointer as in the prior art, this embodiment of the invention finds a set of likely places the user may want to place the pointer. User options extractor 705 is in communication with the electronic device and accesses the contents of computer display 704. User options extractor 705 outputs the set of user options that the user could possibly click on. The definition of user options and the methods of user options extractor 705 are similar to those of user options extractor 602 in FIG. 6. Each of the extracted user options has at least one point on the display of the electronic device where it can be clicked on. With this information, pointing control system 700 has access to a finite set of points that are useful to click on. Face-based control system 100, as described above, interprets the user's facial motions as one of a set of categories, preferably including a category meaning "no action".

Selector 706 serves the function of associating a category output from face-based control system 100 with one or more of the user options output from user option extractor 705. There are several ways in which this can be done. Preferably, face-based control system 100 is configured to categorize the facial motions by their spatial direction. For example, if face-based control system 100 is detecting light reflected from an eye or the mouth of the user, the categories could include "up", "down", "left", "right", and possibly more precise directions. Additional inputs could result from multiple motions in the same or different directions, for example, an "up then right" or an "up then up" move. If this is the case, selector 706 could select, as the next selected user option, whatever user option is next in the corresponding direction relative to the previous user option output. For example, if the category output by face-based control system 100 is "up", selector 706 would select the user option that is closest in the upward direction from the previously-selected user option.

Alternately, if the categories are not organized by direction, other types of selection of the next user options will be apparent. The simplest case, requiring only two categories, would be "previous" and "next" commands that simply scrolled through all possible user options.

Point and click generator 707 converts the selected user option into a set of mouse moves and clicks 708, as appropriate to select the user option on the electronic device. On a Windows PC, this could be implemented by using the mouse_event functions on a point within the specified user option, or by using other techniques known in the art. Point and click generator 707 could alternately be replaced by any module that accesses the indicated user options, particularly for electronic devices that do not use a mouse, by using techniques for the particular electronic device known in the art.

Figure 8:
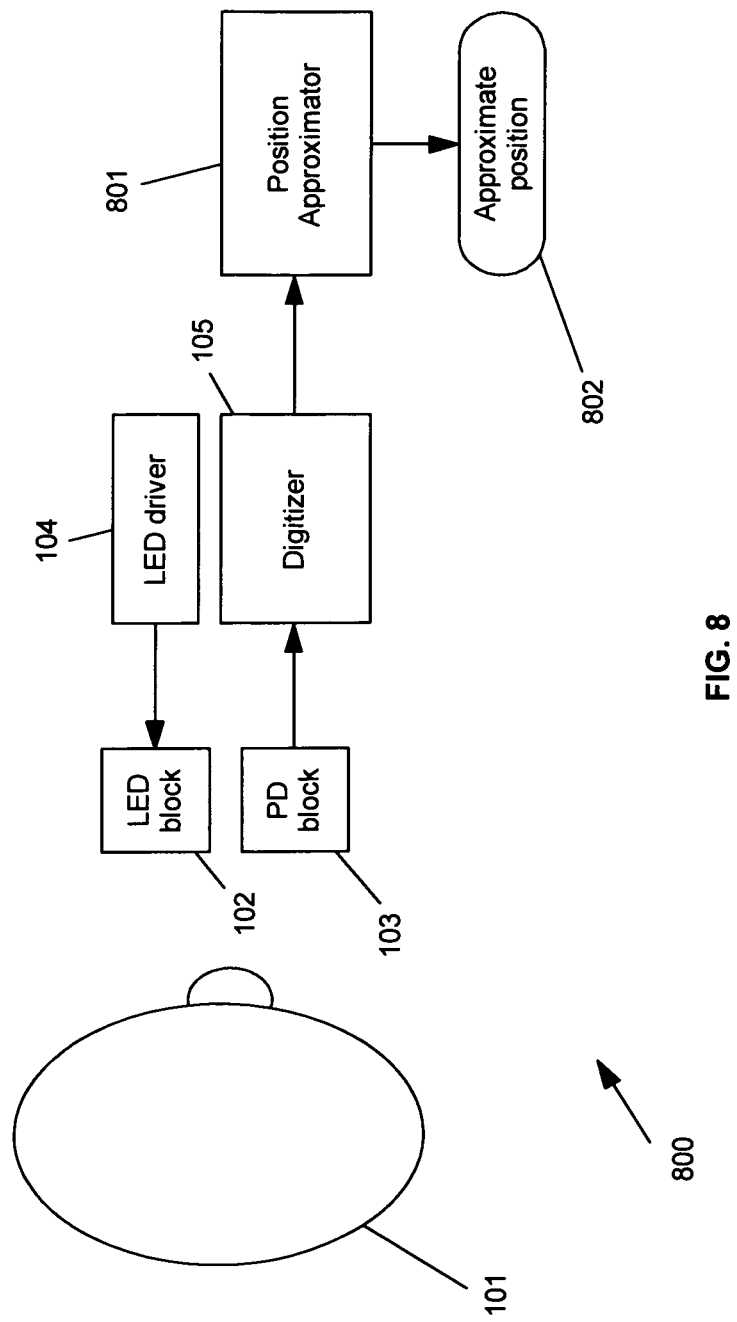
FIG. 8 is a block diagram of a preferred embodiment of an approximate eye tracker of the present invention.

FIG. 8 is a block diagram of a preferred embodiment of an approximate eye tracker 800, of the present invention. Approximate eye tracker 800 uses many of the same modules as face-based control system 100, for example, LED block 102, PD block 103, LED driver 104, and digitizer 105. However, instead of categorizing the output of digitizer 105 as a digital category, position approximator 801 computes and provides an approximate position 802 or pointing location based on the digitizer 105 output. Position approximator 801 is a conversion module that converts between the digitizer 105 output and provides, as its conversion output, an approximate position. There are several techniques that can be used to implement position approximator 801. Preferably, during a calibration process, the user is asked to look at several known points on the electronic device, another surface, or in space. The outputs from digitizer 105 are recorded and used as training examples for a Neural Network. The training outputs for the Neural Network would preferably be the respective known points on the electronic device. Then, in use, the outputs of digitizer 105 are used as inputs to the Neural Network, and the outputs of the Neural Network indicate an approximate calculation of position, using Neural Network techniques are known in the art.

In this embodiment of the present invention, face-based control system 100 in FIG. 7 would preferably be replaced with approximate eye tracker 800. Preferably, selector 706 would compare the positions of the user options from user options extractor 705 to the approximate position outputted by approximate eye tracker 800, and select the best match to be the output of selector 706, using matching techniques known in the art. In any of the above embodiments of the invention, the functionality of approximate eye tracker 800 may be used in place of the functionality of face-based control system 100 to make use of the approximate position instead of a set of categories. For example, using approximate eye tracker 800 in mouth gesture control system 200 would result in a control system that outputs an approximate position indicated by the user instead of producing a discrete digital control output. Similarly, using approximate eye tracker 800 in eye movement control system 400 would result in a control system that outputs approximate positions instead of producing a discrete digital control output. In an alternate embodiment of the present invention, the techniques of both approximate eye tracker 800 and face-based control system 100 could be used in the same device to provide both types of control functionality: a control output representing a category and an approximate position.

Hardware and Software Details

Figure 9:
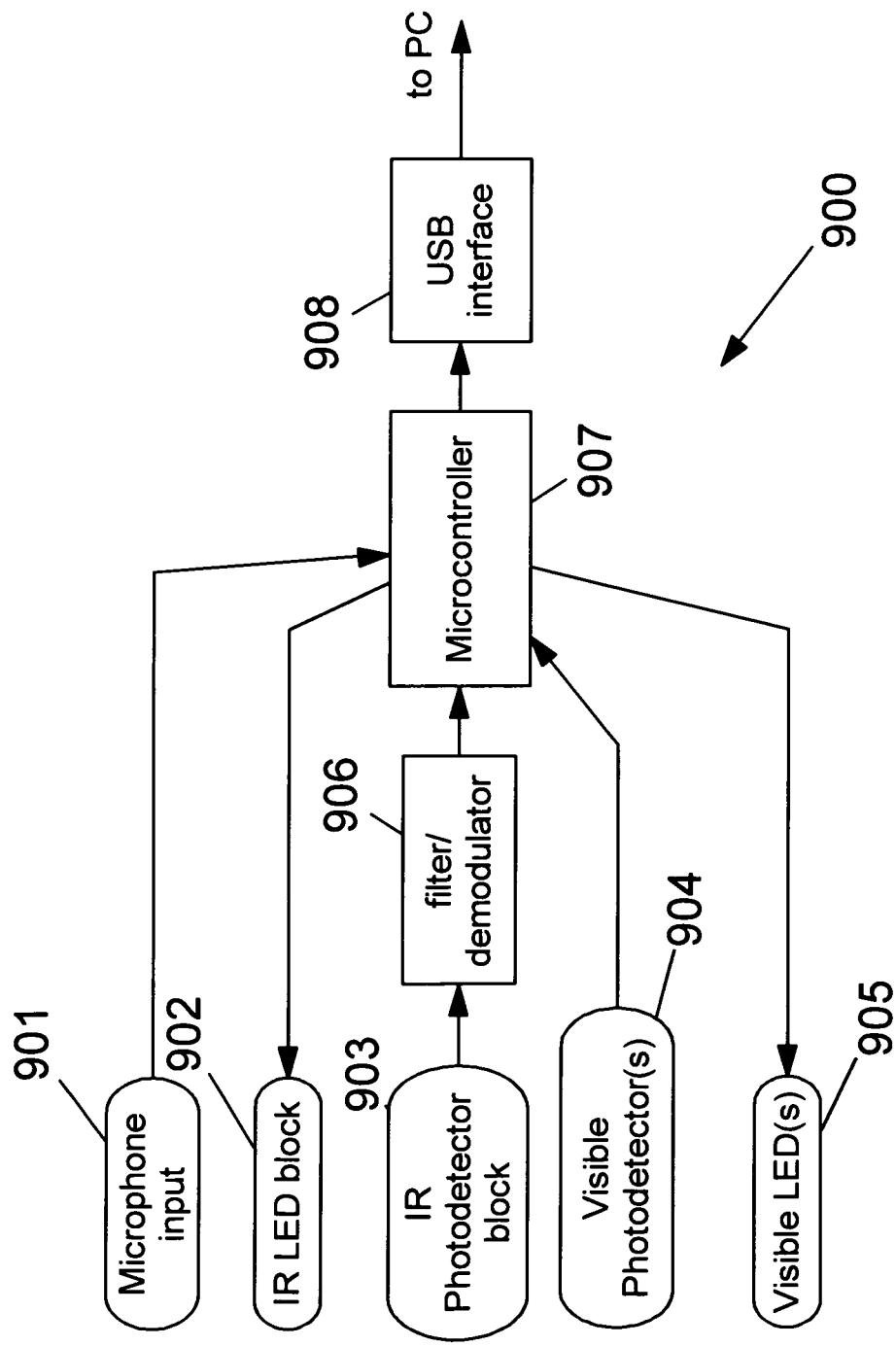
FIG. 9 is a block diagram of a preferred embodiment of electronics of the present invention.

FIG. 9 is a block diagram of a preferred embodiment of electronics 900 of the present invention. Electronics 900 is one way that features of the present invention may be implemented. Preferably, microcontroller 907 generates a square wave that drives one or more IR LED block 902 at a modulation frequency, for example 1000 Hz. Light from the user is reflect to IR photodetector block 903. Preferably, the electrical output or outputs from IR photodetector block 903 is processed by filter/demodulator 906, for example, a 1000 Hz bandpass filter, followed by a diode-based peak detector. This provides a varying DC voltage corresponding to the light intensity. One such filter and detector may be shared if there are multiple photodetectors in IR photodetector block 903, or alternately, multiple such filters and detectors may be individually provided. The output or outputs of filter/demodulator 906 is input to one or more analog-to-digital (ND) inputs of microcontroller 907. Optionally, microphone input 901 is also used to obtain an analog waveform from a microphone, such as the headset microphone 202 of FIG. 2. This analog voltage can be fed directly to an A/D input of microcontroller 907, or optionally, can be fed through other analog processing circuitry, for example, similar to filter/demodulator 906. If a photodetector-based context sensor 106 is used, the input from the one or more visible photodetector(s) 904 may be input to one or more A/D inputs of microcontroller 907, optionally through additional analog processing electronics. Visual feedback to the user may optionally be provided by driving one or more visible LED(s) 905 by one or more digital outputs of microcontroller 907. Microcontroller 907 may perform all, some, or none of the additional processing described above, for example pattern matcher 107, time delay 604, and position approximator 801. Preferably, the output from electronics 900 is sent to the electronic device, such as a PC, by USB interface 908 or by any other compatible interface. It will be understood by those skilled in the art that there are many variations in electronics 900 that may be used to implement the present invention without departing from the scope of the invention.

Figure 10:
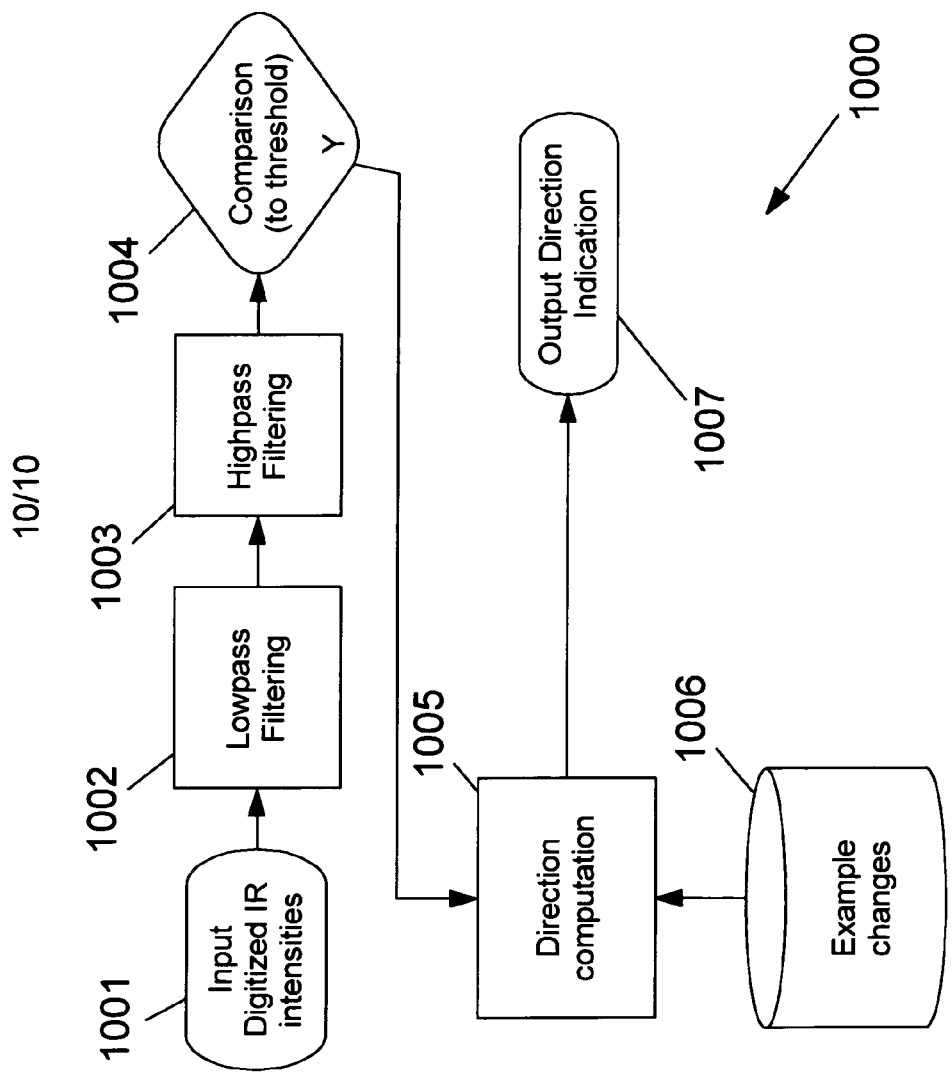
FIG. 10 is a diagram of a preferred embodiment of a pattern-matching algorithm of the present invention.

FIG. 10 is a diagram of a preferred embodiment of a pattern-matching algorithm 1000 of the present invention. Pattern-matching algorithm 1000 is one way that the functionality of pattern matcher 107 may be implemented. The flow starts with input digitized IR intensities 1001, that obtains input, for example, from the output of PD block 103. The inputs are processed by low pass filtering 1002 to remove variations and noise that are faster than the anticipated motions of the face of the user, for example, at a cutoff frequency between approximately 10 Hz and 100 Hz. Next, the output of low pass filtering 1002 is passed through high pass filtering 1003 to provide only the changes in value, for example, a cut-off frequency of approximately 0.2 Hz to 2 Hz. The amplitude of the output of high pass filtering 1003 is compared by a comparison 1004 to a threshold value, for example, between 1% and 25% of full scale, to determine if significant change has occurred. If significant change has occurred according to comparison 1004, a direction computation 1005 process compares the changes in value of the outputs of low pass filtering 1002 to changes in value that have been previously stored in example changes 1006. Comparison 1004 uses techniques such as described earlier, or for example, a vector subtraction, known in the art, of the stored example changes 1006 and the changes in value of the outputs of low pass filtering 1002, to decide which stored change in example changes 1006 is most similar. For example, if there are three digitized IR intensities processed by low pass filtering 1002, preferably, the change of each of the three intensities would be compared to the corresponding change in the three intensities stored in example changes 1006. The most similar change, or preferably also the possible decision that no stored change is similar enough, is output by output direction indication 1007, and preferably is represented as an integer between 0 and 255, where an integer in this range is associated with each of the stored changes in example changes 1006. It will be understood by those skilled in the art that there are many variations in pattern-matching algorithm 1000 that may be used to implement the present invention without departing from the scope of the invention.

While there has been illustrated and described what is at present considered to be the preferred embodiment of the subject invention, it will be understood by those skilled in the art that various changes and modifications may be made and equivalents may be substituted for elements thereof without departing from the true scope of the invention.

What is claimed is:

1. A control system for enabling a user to interface with an electronic device with mouth control comprising:
   a light-emitting means, comprising one or more light-emitting devices, that causes light to shine on the user's face;
   a light-detection means, comprising one or more light-detecting devices, that detects the intensity of light reflected from the user's face from the light-emitting means and outputs a plurality of light-reflection signals corresponding to a plurality of combinations of the light-emitting devices and the light-detecting devices;
   a holding means for aiming the light-detection means and/or the light-emitting means primarily at the user's mouth, cheeks, and/or chin;
   a pattern-matching means that inputs the light-reflection signals and outputs a control output category signal; and
   a controller means that inputs the control output category signal and outputs a control signal to control the electronic device,
   wherein each of the one or more light detecting devices is a photodiode or phototransistor,
   whereby the motions and positions of and surrounding the user's mouth can be detected and interpreted as control commands for the electronic device.

2. The control system of claim 1, wherein the light-emitting means comprises a plurality of light emitting devices, and/or the light-detection means comprises a plurality of light detecting devices and the pattern-matching means includes means to compare relative intensities between at least two of the light-reflection signals.

3. The control system of claim 1, wherein the holding means further comprises boom attachment means, wherein the boom attachment means attaches the mounting means to a boom attached to a headset, whereby the benefits of using the control system are available without requiring the user to don additional devices.

4. The control system of claim 1, further comprising extraction means in communication with the electronic device, wherein the extraction means outputs a plurality of user options available on the interface of the electronic device,
   further comprising selection means that converts the control output category signal output by the pattern-matching means into a selection of at least one user option from among the user options outputted by the extraction means and outputs a user option selection,
   wherein the controller means provides a control input to the electronic device corresponding to the user option selection.

5. The control system of claim 4, wherein the selection means outputs a user option selection corresponding to the previous, next, up, down, left, or right user option relative to one of the user option selections that had previously been outputted by the selection means.

6. The control system of claim 1, wherein the controller means comprises means to cause a mouse click action to occur in the electronic device.

7. The control system of claim 1, wherein the controller means comprises means to cause a text input action to occur in the electronic device.

8. The control system of claim 1, wherein the Controller means comprises means to cause the mouse pointer to move to a point on the interface of the electronic device.

9. The control system of claim 1, further comprising a head tracker that outputs head motion indications, wherein the head motion indications are inputted to the pattern matching means, and wherein the pattern-matching means outputs the control output category signal based on the head motion indications.

10. A method for enabling a user to interface with an electronic device with mouth control comprising:
   shining light on the user's face with a light-emitting means,
   detecting light reflected from the user's face from the light-emitting means and outputting a light-intensity signal with a light-detection means,
   aiming the light detection means and/or the light-emitting means primarily toward the user's mouth,
   matching the light-intensity signal to stored light-intensity patterns and outputting a control output category signal, and
   outputting a control signal to the electronic device based on the control output category signal,
   wherein the shining a light on the user's face comprises illuminating one or more light emitting devices and the detecting light reflected from the user's face comprises receiving light with one or more light detecting devices, and
   wherein the receiving light from with or more light detecting devices comprises receiving light with one or more photodiodes or phototransistors.

11. The method of claim 10, wherein the shining light on the user's face comprises shining light from a plurality of light emitting devices, or the detecting light reflected from the user's face from the light-emitting means comprises receiving light from a plurality of light detecting devices.

12. The method of claim 11, wherein the aiming the light detection means and/or the light-emitting means further comprises mounting the light-detection means and/or the light-emitting means to a boom attached to a headset, whereby the benefits of using the control system are available without requiring the user to don additional devices.

13. The method of claim 11, further comprising extracting from the electronic device a plurality of user options available on the interface of the electronic device,
   further comprising using the control output category signal to select at least one user option on the electronic device from among the user options extracted from the electronic device.

14. The method of claim 13, wherein the outputting of a control signal to the electronic device comprises selecting the previous, next, up, down, left, or right user option from the plurality of user options relative to one of the user options that had previously been selected from the user options.

15. The method of claim 11, wherein the outputting a control signal to the electronic device comprises causing a mouse click action to occur in the electronic device.

16. The method of claim 11, wherein the outputting a control signal to the electronic device comprises causing a text input action to occur in the electronic device.

17. The method of claim 11, wherein the outputting a control signal to the electronic device comprises causing the mouse pointer to move to a point on the interface of the electronic device.

18. The method of claim 11, further comprising using a head tracker to detect head motions, and further comprising using the detected head motions for outputting a control output category signal.

* * * * *